Oct. 16, 1934.  L. EDWARDS  1,977,507

STEERING WHEEL WRITING CASE

Original Filed March 21, 1933

Inventor
Leroy Edwards
By Watson E. Coleman
Attorney

Patented Oct. 16, 1934

1,977,507

UNITED STATES PATENT OFFICE 1,977,507

STEERING WHEEL WRITING CASE

Leroy Edwards, Stanley, N. Dak.

Application March 21, 1933, Serial No. 661,970
Renewed June 8, 1934

2 Claims. (Cl. 45—58)

This invention relates to writing cases and more particularly to a writing case which is adapted to be removably mounted on and supported from a vehicle steering wheel.

An object of this invention is to provide a convenient writing case or desk which is of a convenient size and which embodies means whereby it may be removably engaged with the rim of a steering wheel, the device being removed from the wheel when the vehicle is in motion.

Another object of this invention is to provide a relatively thin case which can be readily placed in the front of a motor vehicle when not in use and which will be capable of removably engaging the steering wheel so that where the operator of the vehicle is delivering articles and it is necessary to write to a certain extent, the operator will have a convenient desk on which to write.

The above and various other objects and advantages of this invention will in part be described and in part be understood from the following detailed description of the present preferred embodiment, the same being illustrated in the accompanying drawing wherein:—

Figure 1:
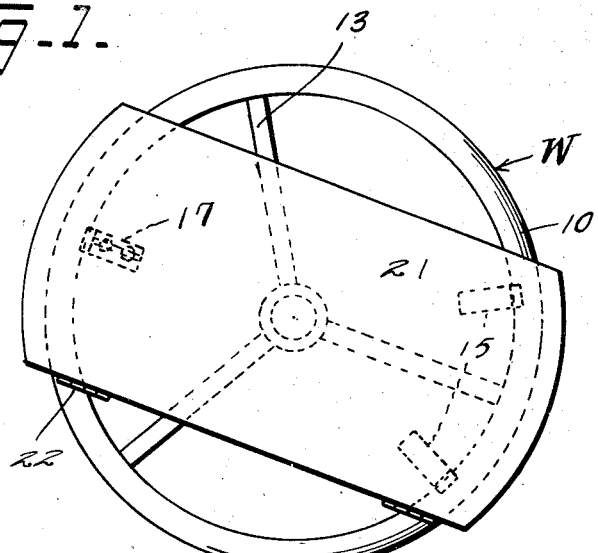
Figure 1 is a detail front elevation of a device constructed according to the preferred embodiment of this invention mounted on a steering wheel.
Figure 2:
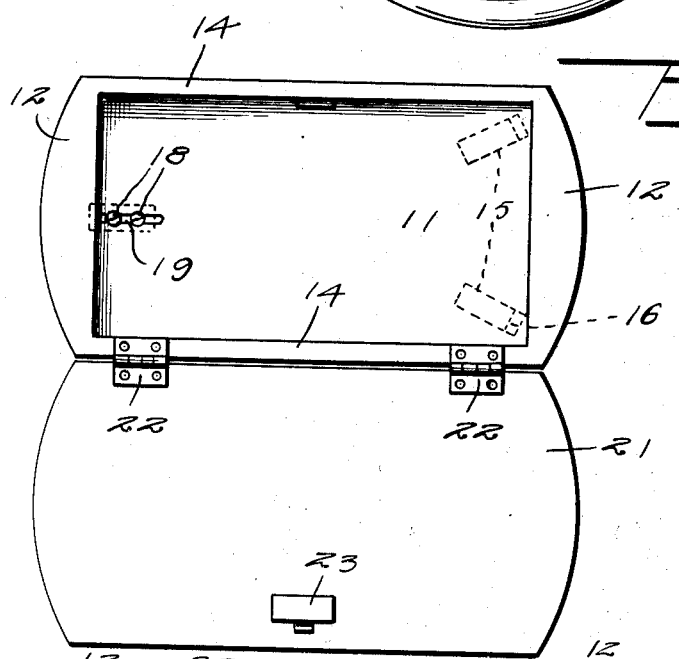
Figure 2 is a plan view of the device in open position.
Figure 3:
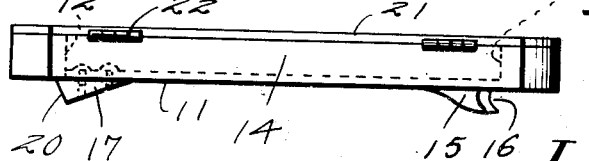
Figure 3 is a detail side elevation of the device.

Referring to the drawing wherein like characters of reference designate corresponding parts throughout the several views, the letter W designates generally a steering wheel of a vehicle of any conventional type which is provided with a rim 10 and spokes 13.

A case comprising a bottom 11, end walls 12 and side walls 14, is adapted to be removably mounted on the steering wheel W and in order to conveniently hold the case on the vehicle, I have provided a plurality of radially arranged lugs which are secured to the bottom 11 and at least two of these lugs 15 are secured to the bottom 11 adjacent one end thereof, and are provided with a curved outer end portion 16 which is adapted to engage the inner surface of the rim 10, so that the case will be firmly held against endwise movement on the wheel W. A third lug 17 is secured to the bottom 11 adjacent the opposite end of the case and this lug 17 is a movable lug and bolts or screws 18 extend through a slot 19 in the bottom 11 and hold the lug 17 in the desired position relative to the two lugs 15 so that the writing case may be removably mounted on any size of steering wheel. The outer end 20 of the lug 17 is inclined inwardly and downwardly so that the case can be readily mounted on the steering wheel and removed without moving the lug 17 or either of the lugs 15.

A top or lid 21 is hinged as by hinges 22 to the side walls 14 and a locking means 23 of conventional construction may be used to releasably lock the lid 21 so as to hold any articles within the case against loss. The case herein disclosed is preferably made relatively thin and the opposite ends 12 of the case are curved to substantially conform to the curvature of the steering wheel, it being the object to provide a case which will not project greatly beyond the periphery of the steering wheel.

In the use of this device, the lugs 15 are first engaged with the inside of the rim 10, and these lugs are spaced apart a sufficient distance so that they will readily engage between a pair of spokes or, if desired, a spoke of the wheel W may be positioned between these lugs 15, thereby holding the case against circumferential movement upon the rim 10. The bottom of the case may then be swung toward the rim 10 so that the end 20 of the lug 17 will engage the inside of the rim and in this position, the case will be firmly held on the rim 10 and the wheel W may be turned, if desired, so as to turn the case to the most convenient angle for writing. The inside of the case may be used to hold the necessary papers and these papers or other articles will be held against removal by locking means 23.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A writing case as set forth comprising a hollow structure including a relatively flat top and a flat bottom, a pair of lugs secured to the bottom adjacent one end thereof, said lugs having curved outer portions for engagement with the rim of a steering wheel and at least another lug secured to the bottom adjacent the opposite end for engagement with the inside of a wheel rim and coacting with the pair of lugs to hold the case against movement on the steering wheel.

2. A writing case as set forth comprising a hollow structure including a relatively flat top, a means for hinging the lid to the top, a locking means for locking the lid to the hollow structure, a pair of spaced lugs fixedly secured to the bottom adjacent one end thereof, said lugs being engageable with the inside of a steering wheel rim, another lug secured to the bottom of the hollow structure, means for adjustably securing said latter lug to the bottom, each of said lugs acting to hold the case against lateral movement on a steering wheel rim.

LEROY EDWARDS.